United States Patent [19]

Appoldt et al.

[11] 4,304,621

[45] Dec. 8, 1981

[54] APPARATUS FOR THE MANUFACTURE OF A JACKET FOR A FLEXIBLE DISK FOR DATA RECORDING

[75] Inventors: Hans Appoldt, Neuried; Werner Wagner, Oberkirch; Karl Hauck, Maxdorf; Reinhold Baur, Offenburg, all of Fed. Rep. of Germany

[73] Assignee: BASF Aktiengesellschaft, Ludwigshafen, Fed. Rep. of Germany

[21] Appl. No.: 177,855

[22] Filed: Aug. 14, 1980

Related U.S. Application Data

[62] Division of Ser. No. 66,553, Aug. 15, 1979.

[30] Foreign Application Priority Data

Sep. 28, 1978 [DE] Fed. Rep. of Germany ....... 2842185

[51] Int. Cl.[3] ........................ B32B 31/00; B65C 9/04; B31F 5/00; B65D 85/00

[52] U.S. Cl. .................................... 156/443; 156/299; 156/227; 156/556; 206/444; 206/313; 493/231; 493/243; 493/247

[58] Field of Search ...................... 156/227, 226, 73.5, 156/108, 216, 299, 391, 443, 448, 556, 558, 569, 563; 206/312, 313, 444; 270/61 R, 62, 45, 58; 493/27, 306, 442, 231, 243, 247

[56] References Cited

U.S. PATENT DOCUMENTS

| | | | |
|---|---|---|---|
| 2,056,903 | 10/1936 | Mayer | 270/62 |
| 3,317,038 | 5/1967 | Bade et al. | 206/313 |
| 3,354,568 | 11/1967 | Koschier | 156/108 |
| 3,668,658 | 6/1972 | Flores et al. | 206/303 |
| 3,989,579 | 11/1976 | Sheldon | 156/443 |

FOREIGN PATENT DOCUMENTS

| | | |
|---|---|---|
| 2634501 | 3/1977 | Fed. Rep. of Germany . |
| 779108 | 7/1957 | United Kingdom . |
| 1494987 | 12/1977 | United Kingdom . |

*Primary Examiner*—Edward C. Kimlin
*Assistant Examiner*—L. Falasco
*Attorney, Agent, or Firm*—Keil & Witherspoon

[57] ABSTRACT

An apparatus for the manufacture of a jacket, comprising two cover sheets joined to one another, for a flexible disk for data recording, the cover sheets and the nonwoven lining being punched out in the form of blanks including the functional apertures, and the cover sheet blank and the nonwoven blank being joined to one another and then folded to form the jacket, wherein the sheet material for the cover sheets is transferred from a magazine, with the aid of mechanical, air-operated grippers provided with positioning means, to an assembly surface and is there positioned, the sheet of nonwoven material from a second magazine is tacked onto the cover sheet material by spot-welding and is then joined thereto over the entire surface by thermal welding, thereafter the cover sheet material thus provided with the nonwoven covering is transferred to a holder frame and then conveyed, with this frame, to a punching device where it is punched out to form a blank provided with the functional apertures, subsequently the blank is removed from the holder frame by means of mechanical, air-operated grippers and is placed in the correct position on a carrier and folded to form the jacket, and at the same time the folds are stabilized by heating and subsequently cooling the material in the region of the folds, and the surfaces which come into contact on folding are welded to one another in the marginal portions of the jacket.

4 Claims, 9 Drawing Figures

APPARATUS FOR THE MANUFACTURE OF A JACKET FOR A FLEXIBLE DISK FOR DATA RECORDING

This application is a division of U.S. patent application Ser. No. 066,553, filed on Aug. 15, 1979.

The present invention relates to an apparatus or assembly system for the manufacture of a jacket, comprising two cover sheets joined to one another and lined with a nonwoven, for a flexible disk for data recording, in which apparatus the cover sheets and the nonwoven lining are punched out of sheet material, in the form of blanks with the functional apertures, and the cover sheet blank and the nonwoven blank are joined to one another and are subsequently folded to form the jacket.

A conventional jacket for a flexible magnetic disk comprises a PVC sheet which is folded in the middle and is bent over and sealed at the sides and at one end. On the inside, there is a nonwoven lining which allows the circular disk to be easily rotatable within the jacket, and picks up dust. The jacket is square in shape, and has central opertures of larger diameter than the hole in the magnetic disk in its two thicknesses, as well as aligned radial elongate slots in its two thicknesses to permit the recording and playing back of information by means of a magnetic head. According to the prior art, the PVC cover sheets are supplied in the form of rectangular pieces of material out of which blanks with the apertures and slots are punched by placing each sheet separately in a punching machine. The nonwoven linings are produced in like manner. Thereafter the cover sheets and pieces of nonwoven are thermally welded together. The punched-out holes serve to align the blanks relative to one another. The jackets are then completed, at various bending, folding and welding stations, by subjecting the blanks to pressure and heat.

This conventional technique of manufacture has various disadvantages:

1. The pieces of cover sheet material and nonwoven material are inserted manually into the punching machine, and the scrap is removed manually.
2. The cover sheet blanks and the non-woven blanks are punched out separately.
3. Precise alignment of the punched-out nonwoven lining with the punched-out cover sheet is difficult to achieve.
4. Separate bending, folding and welding stations are required to process the blanks into the finished jacket.

These disadvantages lead to dimensional inaccuracies in the finished jackets and prevent continuous manufacturing.

It is an object of the present invention to provide an apparatus wherein the jacket described at the outset can be manufactured in one pass, and the length of the edges of the cover sheet and nonwoven lining can be kept within a tolerance of 1 mm.

We have found that this object is achieved, according to the invention, by an apparatus wherein, in a first position, the sheet material for the cover sheets is transferred from a magazine, with the aid of mechanical, air-operated grippers provided with positioning means, to an assembly surface and is then brought, with this surface, into a second position and is there positioned, in which second position the sheet of nonwoven material from a second magazine is tacked onto the cover sheet material by spot-welding, and in a third position is joined thereto over the entire surface by thermal welding, thereafter the cover sheet material thus provided with the nonwoven covering is transferred, via an intermediate stack, by means of co-operating gripping, feeding and lifting devices to a holder frame and is then conveyed, with this frame, via a conveying zone to a punching device where it is punched out to form a blank provided with the functional apertures, subsequently the blank is removed from the holder frame by means of further mechanical, air-operated grippers and is placed in the correct position on an assembly carrier, the scrap remaining in the holder frame being ejected at a collecting point whilst the frame is being returned to its initial position, the blank is folded on the assembly carrier, in successive positions, by controlled turning and lifting movements of various folding means, to form the jacket, at the same time the folds are stabilized by heating and subsequently cooling the material in the region of the folds, and the surfaces which come into contact on folding are joined to one another in the marginal portions of the jacket, after which the finished jacket can be taken out of the assembly carrier.

In a further embodiment of the invention, the parts to be processed into the jacket are held on the grippers on the assembly surfaces and on the holder frame, by means of suction.

Preferably, the parts of the jacket which come into contact are joined by welding. Instead of HF welding, it is, however, also possible to employ ultrasonic equipment, thermal welding equipment and equipment using fast-curing adhesives.

More particularly the invention relates to an assembly system comprising the combination of the following units:

(a) a first assembly table, rotatable in steps, with several stationary receiving surfaces and transfer devices, and a device for joining the cover sheet material and the nonwoven material over their entire surface by welding, (b) a further transfer device, comprising a gripper, friction rollers and a lifting device which is actuatable by a fluid medium, for transferring the welded cover sheet and nonwoven lining to a holder frame resting in a seat and possessing holding means which can be actuated in a controlled manner, (c) downstream thereof, a punching device with a gripper for lifting the punched blank out of the punching device, and depositing points for the punched blanks and the scrap, and (d) a second assembly table, rotatable in steps, with receiving surfaces which are provided with positioning elements for the blank, means, displaceable both by pivoting and along the rectangular spatial coordinates of the jacket to the produced, for folding the blank being allocated to the individual index positions of the receiving surfaces, the said folding means, some of which are connected to the assembly table, being actuatable in a controlled manner, and the last index position having allotted to it a device for joining the parts of the blank which have come into contact as a result of the folding operation.

The advance in the art achieved by the apparatus according to the invention resides in the combination thereby, described above, of hitherto separate operations to be carried out as a continuous operation, entailing savings in time and labor.

BRIEF DESCRIPTION OF DRAWINGS

The invention is described in more detail below with reference to the accompanying drawings, in which.

Figure 1:
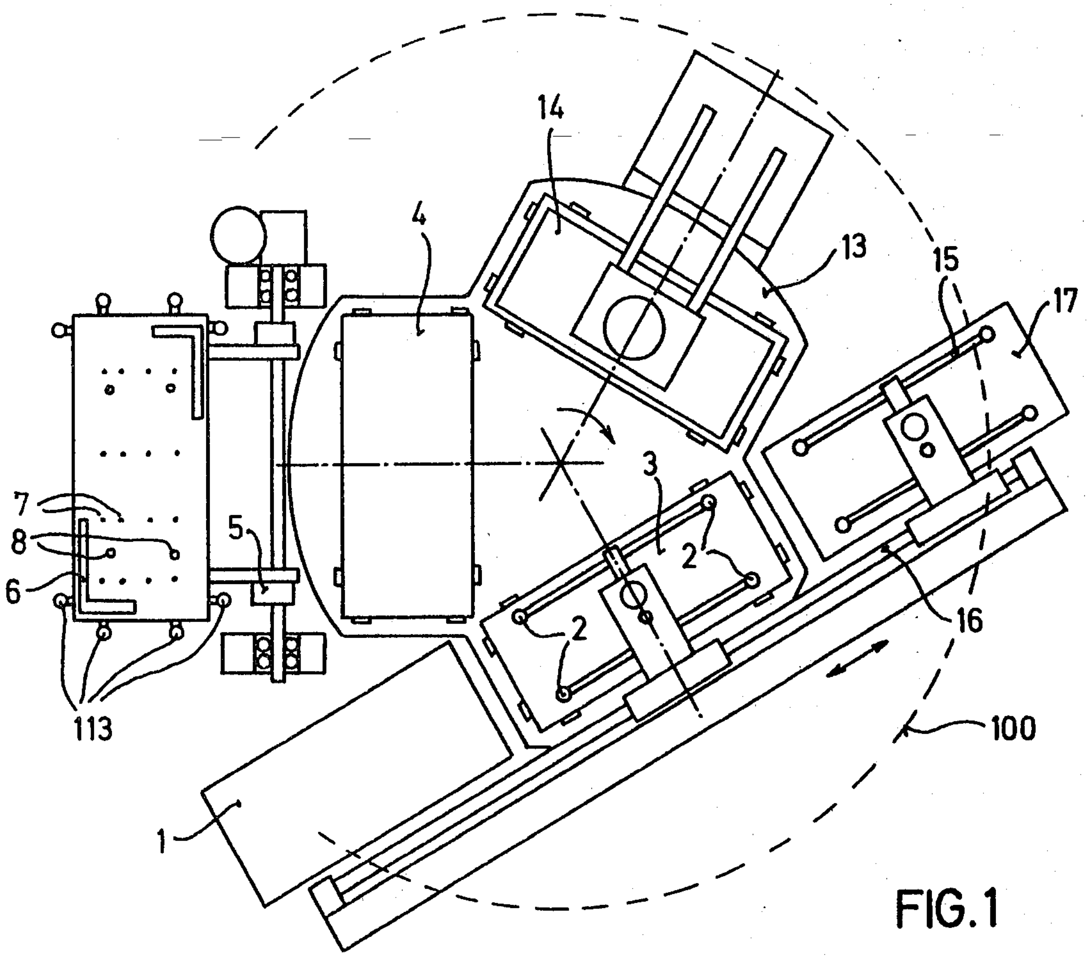
FIG. 1 is a schematic plan view of the assembly table for joining the pieces of cover sheet material and nonwoven material by welding them over their entire surface.
Figure 1A:
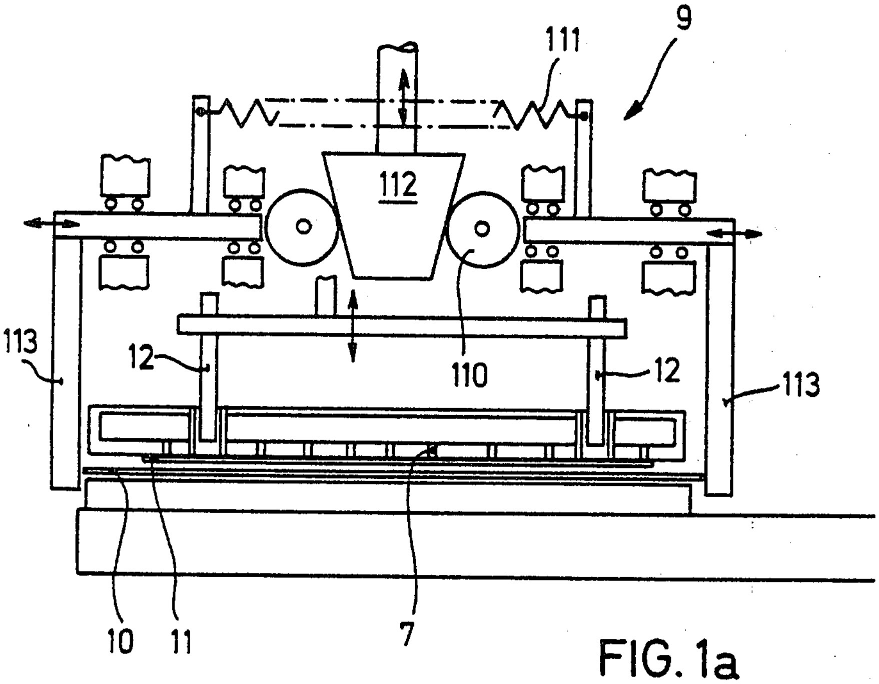
FIG. 1*a* shows the device for precisely aligning the nonwoven material and the cover sheet material.
Figure 2:
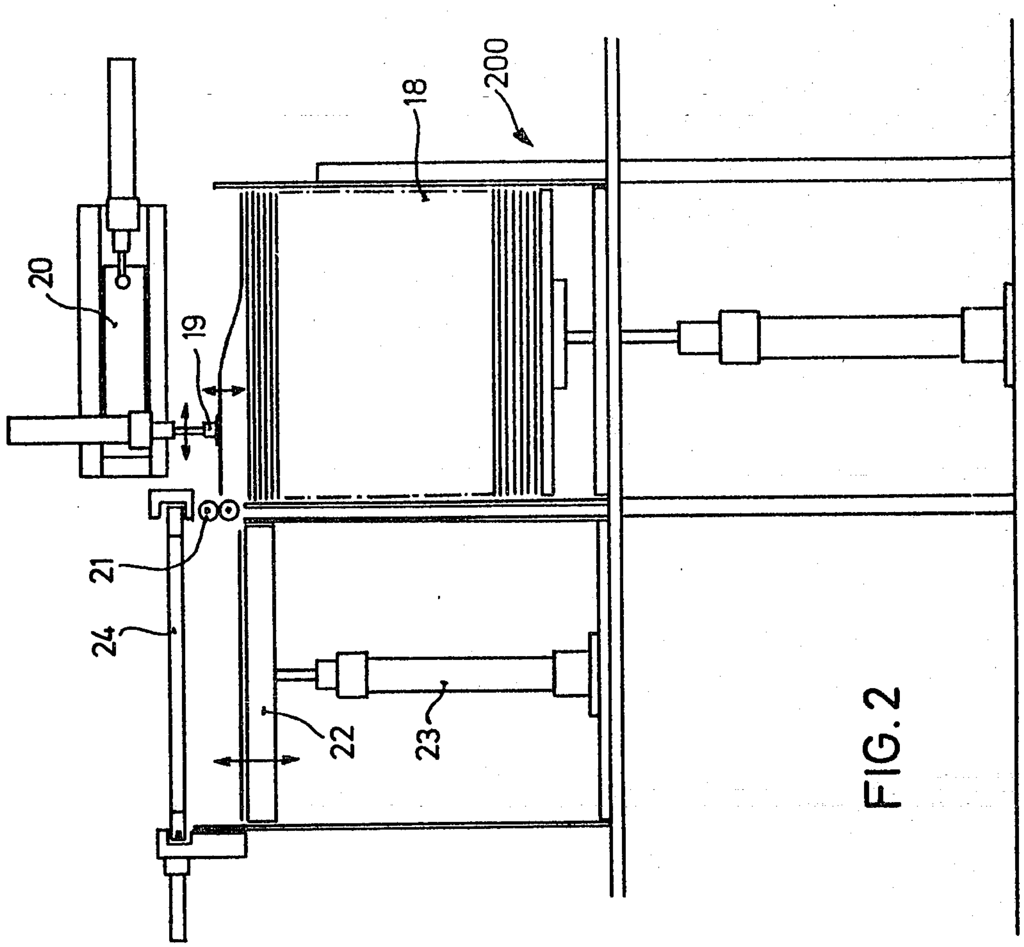
FIG. 2 shows a device for transferring the welded sheets of material from the assembly table shown in FIG. 1 to a punching device shown in FIG. 2*a*.
Figure 2A:
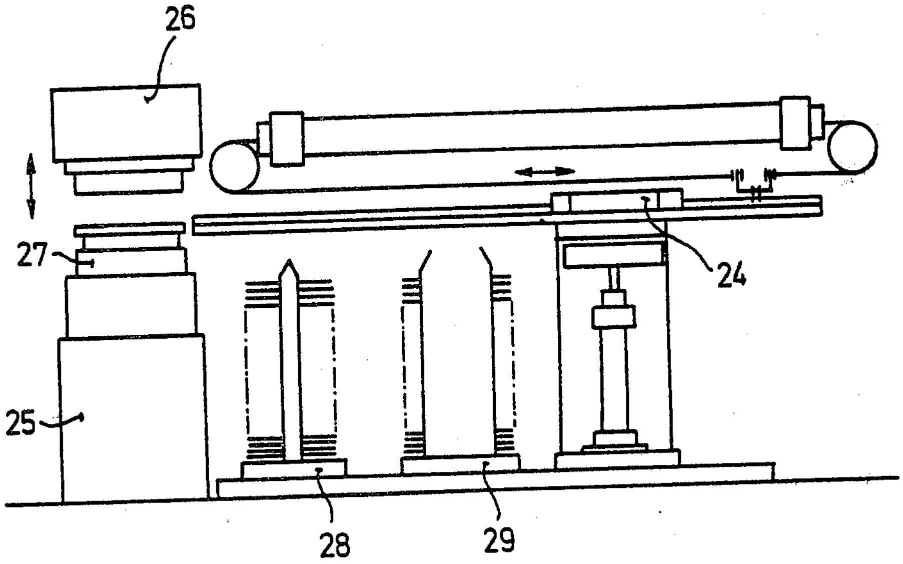
FIG. 2*b* shows the punched-out jacket blank.
Figure 2B:
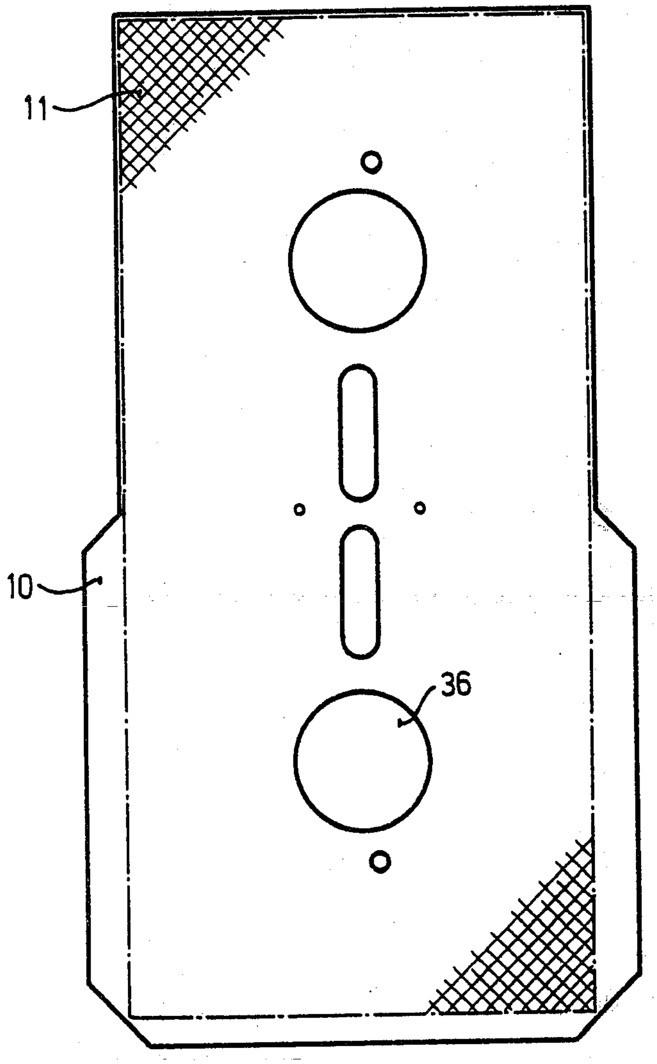
Figure 3A:
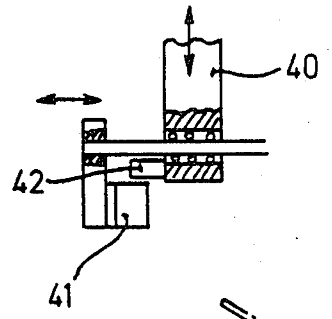
FIG. 3*a* shows a folding blade for folding the jacket blank in half.
Figure 3:
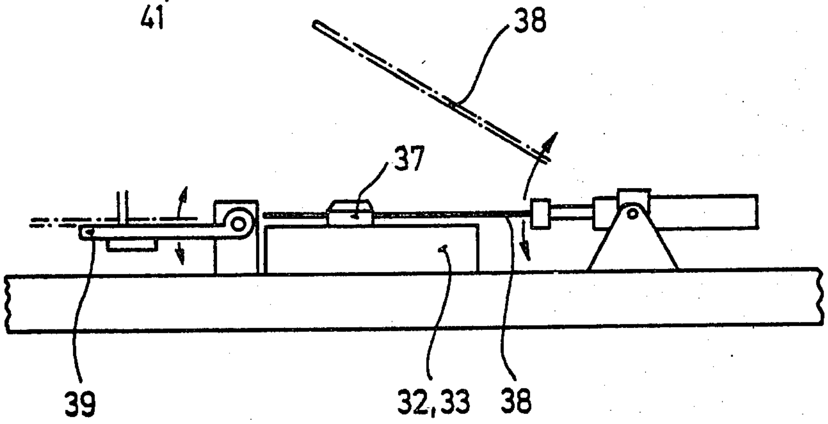
FIG. 3 shows a device for folding the jacket blank.
Figure 3:
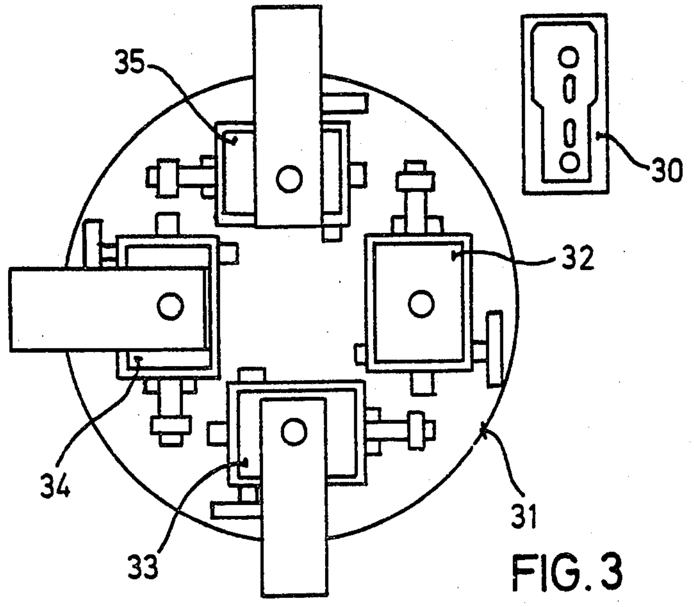
Figure 3B:
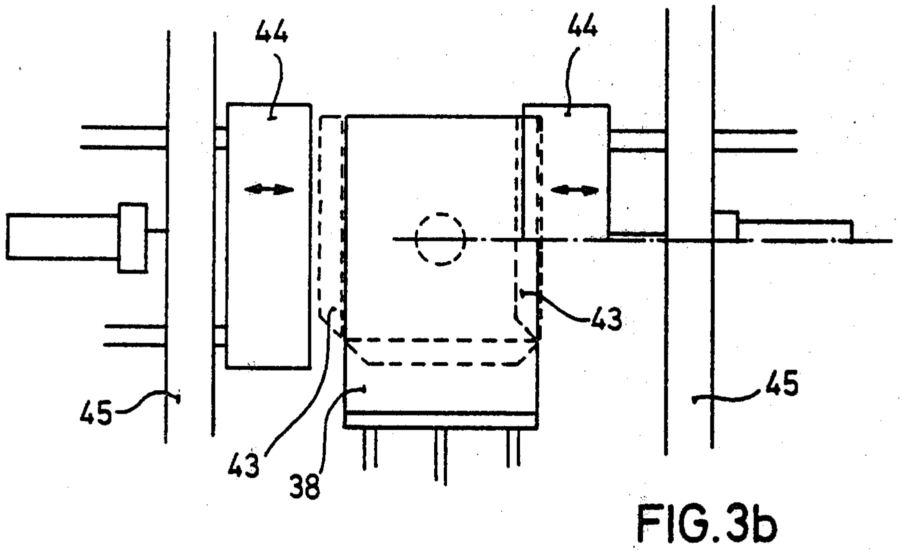
FIG. 3*b* shows the folding cheeks for a further folding operation.
Figure 3C:
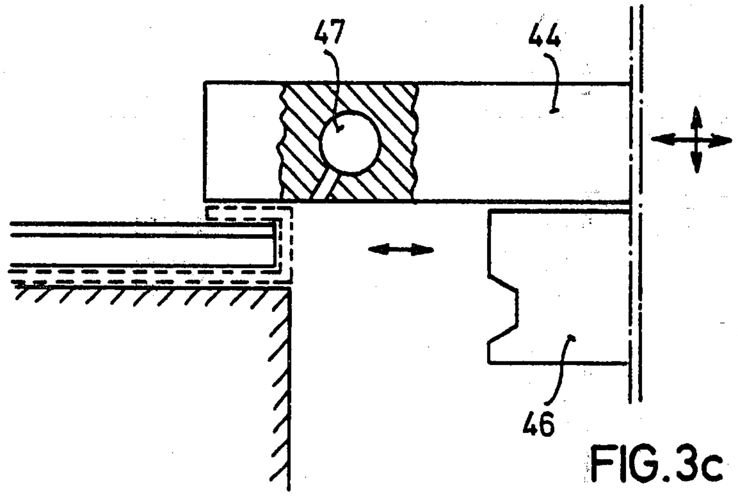
FIG. 3*c* shows a heating and cooling unit for stabilizing the folded edges of the jacket.

The PVC sheets 10 as supplied are stacked in a magazine 1 and picked up by vacuum lifter means 2, which run over the magazine 1 along a guide rail 16, and brought to position 3 of a turret 100. This turret is brought into position 4, the indexing time being 10 seconds, and the manually introduced sheet of nonwoven 11 is applied to the PVC sheet 10 which is in position 4 by swinging over pivotable transfer device 5 which comprises a centering device 6, suction orifices 7, four orifices 8 for the admission of heating rods for spot-welding the nonwoven and the cover sheet material, and an alignment device 9.

The alignment device 9 consists of eight centrically mounted rollers 110, which are urged by means of spring 111 against a cone 112. The eight rollers 110 are connected to eight feelers 113, which abut against the outer edges of the PVC sheet 10. The cone 112, movement of which is effected by a piston and associated cylinder, first causes the feelers 113 to splay by moving the rollers 110 apart. By changing the position of the cone, the feelers 113 are brought up against the edges of the PVC sheet 10 which is so positioned that the central axis of the sheet of nonwoven 11 coincides with the central axis of the PVC sheet 10, the PVC sheet 10 being centered relative to the sheet of nonwoven 11 when all eight feelers 113 grip the PVC sheet 10 with the same pressure. The nonwoven sheet 11 is then tacked to the PVC sheet 10 by means of four heating rods 12.

Station 4 of the turret is then turned to position 13, the indexing time again being 10 seconds, and the PVC sheet 10 is bonded to the nonwoven sheet 11, lying thereon, over its entire surface by means of a heated plate 14 covered with pin-like members. Turret 100 then rotates, in the said indexing time, to the starting position 3 where the welded sheets 10, 11 are picked up by vacuum lifter means 15, located above the station 3, and are transported along the guide rail 16 to the unloading station 17.

From there, the welded sheets 10, 11 are stacked in a magazine 18, picked up individually by vacuum lifter means 19 on feeding device 20, and conveyed, via two transport rollers 21, onto a plate 22 which can be raised or lowered, The piston of cylinder 23 presses the plate 22, with the welded sheets 10, 11 lying thereon, against the vacuum frame 24, which engages sheets 10, 11 and transfers them to punching device 25. The vacuum frame 24 holds the welded sheets 10, 11 firmly during the entire punching operation, in which the punch 26 travels down against the die 27. The particular design of this vacuum frame 24 allows the blank and the scrap to be held separately and deposited separately, when the frame moves out of the punching device 25, in a stacker 28 and a waste collector 29 respectively.

The blanks are transferred to the magazine 30 and are transferred manually from there to the turret 31 of the folding unit, which has four stations, namely the loading/unloading station 32, the station 33 for folding the blank in two, the side-flap folding station 34 and the station 35 for HF welding of the said flaps, and are placed in position on the loading/unloading station 32, hole 36 being engaged by mandrel 37. The folding blade 38 is lowered onto the blank and, during rotation of the turret 31 to station 33, the pivotable arm 39 is swung over, so that one half of the blank is above, and the other half is below, the folding blade 38. The piston 40, associated with a cylinder, is then urged against the folded blank to press the edge of the jacket up against the blade 38 lying between the two jacket halves, whilst at the same time heat is applied by the heating bar 41. After a brief period of heating, the bar 41 is moved away and the cooling means 42 come into action, in order to stabilize the central fold.

When the turret 31 turns to station 34, the pivotable arm 39 returns to its initial position. The side flaps 43 of the blank are folded, by a horizontal and vertical movement of the cheeks 44 of the folding device 45, around the folding blade 38 on both sides.

The cheeks 44 remain in this position until the heating bars 46 have been moved up against the folded-over side flaps 43, the edges have been heated on both sides, the heating bars 46 have returned to their initial positions and cooling of the edges by the cooling means 47 has been completed. The cheeks 44 are then returned to their initial positions and the turret 31 turns to the next station 35.

There, the folded-over side flaps 43 are spot-welded, by means of an HF welding unit, to the other jacket half. When the turret 31 rotates to the next station 32, the folding blade 38 is raised through an angle of 30° and the jacket, with the side flaps welded, can be removed.

The jacket is now finished except for the end flap which is still open. In subsequent operations, the flexible data recording disk is introduced into the jacket and the end flap is folded over, and welded, in a similar manner to that described above.

We claim:

1. An apparatus for the manufacture of jackets for flexible magnetic data recording discs, each said jacket on each side thereof comprising a cover of a first material with a lining of a second, non-woven material and being formed by joining a sheet of said first material and a sheet of said second material together, punching the joined sheets out to form a composite blank having longitudinally thereof two substantially mirror-image sections with openings for permitting the disc to be operated within the completed jacket, folding said composite blank and welding said blank in the area of said folds, said apparatus comprising:

a first stepwise rotatable turntable having a plurality of stations, a transfer device, including vacuum operated gripping means, for placing a sheet of said first material from a stack of said sheets on said turntable in a first of said stations, another transfer device, including other vacuum operated gripping means, for placing a sheet of said second material on top of, and spot welding said second-material sheet to, said first-material sheet in a second of said stations, and means for thermally welding said first-and said second-material sheets together over substantially the entire surface in a third of said stations, a magazine for stacking the welded sheets, a vacuum operated holding frame, a further transfer device for transferring the welded sheets to said holding frame, a punching device, and conveying means for moving said holding frame with the welded sheets therein to said punching device, and a second stepwise rotatable turntable having a plurality of index positions and having pivotally mounted means and heating and cooling means, for folding with the aid of said pivotally mounted means and of a folding blade, one of said mirror image sections of the composite blank over the other section, and for stabilizing folded areas with the aid of said heating and cooling means.

2. An apparatus as claimed in claim 1, wherein said further transfer device includes a gripper, transport rollers and fluid-medium actuated lifting means.

3. An apparatus as claimed in claim 1, wherein separate stacking locations are provided for depositing the punched blank and the scrap, said conveying means depositing, on its return movement, the punched blank and the scrap in said separate locations, respectively.

4. An apparatus as claimed in claim 1, 2 or 3, wherein said blank also has side flaps, wherein said second turntable has further means mounted for movement in both coordinate directions and wherein one of the positions of said second turntable is a loading/unloading position, another position is a folding position for folding, with the aid of said pivotally mounted means and of said folding blade, one of said mirror-image sections of the composite blank over the other section, and yet another position is a position for folding, with the aid of said folding blade and said further means, said side flaps over to close said jacket on its sides.

* * * * *